I. E. McCRACKEN.
GEAR.
APPLICATION FILED APR. 4, 1913.
1,096,258.
Patented May 12, 1914.
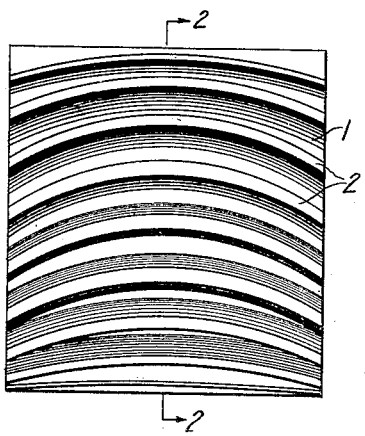
FIG. 1
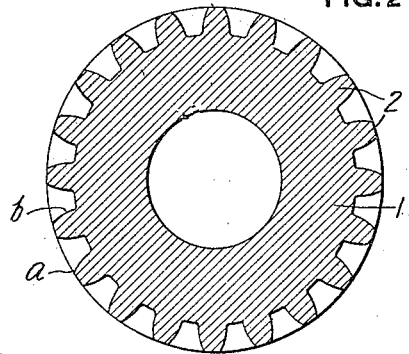
FIG. 2
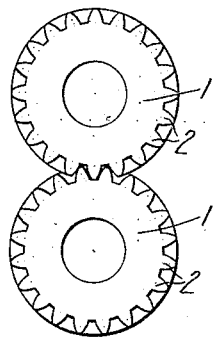
FIG. 5
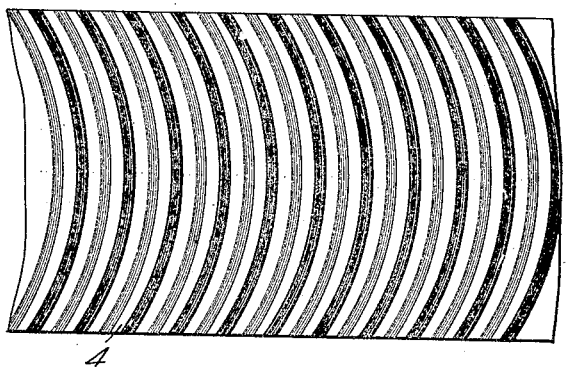
FIG. 4
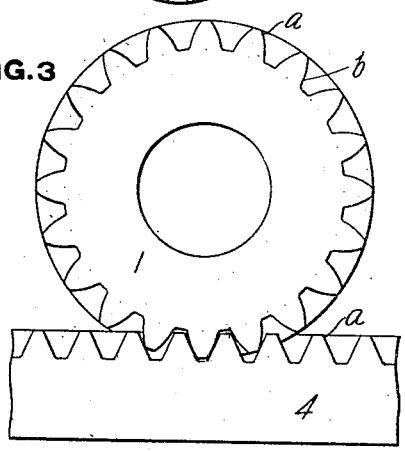
FIG. 3
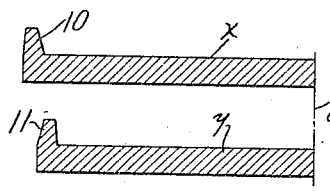
FIG. 6
FIG. 7
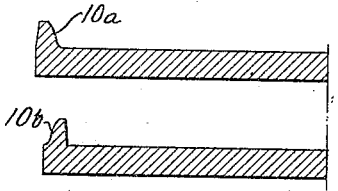
FIG. 8.
FIG. 9.
WITNESSES
W. T. Hohman
Elbert L. Hyde
INVENTOR
Isaac E. McCracken
By Fred'k W. Winter
his attorney

UNITED STATES PATENT OFFICE.

ISAAC E. McCRACKEN, OF PITTSBURGH, PENNSYLVANIA.

GEAR.

1,096,258.
Specification of Letters Patent.
Patented May 12, 1914.

Application filed April 4, 1913. Serial No. 758,966.

*To all whom it may concern:*

Be it known that I, ISAAC E. MCCRACKEN, a resident of Pittsburgh, in the county of Allegheny and State of Pennsylvania, have invented a new and useful Improvement in Gears, of which the following is a specification.

This invention relates to toothed gearing.

The object of the invention is to produce a new and improved gear, which is noiseless in operation, in which the teeth on a pair of gears mesh progressively from end to end, in which the teeth are of varying shape in cross section and are formed with a varying pressure angle from end to end, and are stronger at their ends than in the median plane of the gear.

Other objects of the invention are in part obvious and in part will appear more fully hereinafter.

In the drawings Figure 1 represents a plan view of a gear embodying the invention; Fig. 2 is a cross section thereof on the line 2—2, Fig. 1; Fig. 3 is an end view of the gear from the left in Fig. 1, and showing the same meshing with a rack; Fig. 4 is a plan view of the rack shown in Fig. 3; Fig. 5 is an end view of a pair of meshing gears embodying the invention; Figs. 6 and 7 are detail views of the cutters used in forming the gear; and Figs. 8 and 9 are similar views of a pair of cutters of modified form.

For many years attempts have been made to devise some substitute for the ordinary gear or pinion having teeth which are straight and parallel to the axis of the gear and of the same cross section from end to end. Such gears have a number of objections, among which are the following: The end portions of the teeth are the weakest, and the teeth must, therefore, be made of a cross section from end to end such that the ends of the teeth will stand the greatest duty the gear is required to bear. The middle portions of the teeth must, therefore, be made heavier and stronger than is necessary. Some attempts have been made to strengthen the teeth by shrouding, but this expedient can only be adopted completely at both ends of one of the gears or at one end of each gear, and only incompletely at both ends of each gear. Gears with straight teeth also have the objection that the teeth on a pair of meshing gears engage with each other along their full length simultaneously, with consequent shock, jar, and liability of breakage, and also with an objectionable noise or click. Moreover, the shape of the teeth is such that only one or two teeth on one of the gears can be in contact with the teeth on the other gear at the same time.

The well-known herring-bone gear was devised in an attempt to secure a gear where the teeth mesh or engage progressively from end to end, thereby avoiding shock, jar, and the noisy click. In this gear the teeth are inclined spirally in opposite directions from the median plane of the gear, but the gear has the objection that when cut or machined it cannot be formed with teeth which are continuous and of full cross section from end to end. The gear can be cast, but, of course, is then only fit for a limited duty. If the herring-bone gear is made integral, with the teeth inclined spirally in both directions from the median plane, it is necessary to cut out a certain portion of the metal where the oppositely inclined teeth meet end to end in a median plane, in order to provide clearance for the cutting tool. This has heretofore only been obviated by forming the gear in right and left halves rigidly secured together, but the very fact that such gears are not integral makes them weaker at the median plane where the halves contact. Herring-bone gears have also been made with the oppositely inclined teeth staggered with relation to each other at the median plane, but here the teeth are not continuous from end to end of the gear. It has also been proposed to make gears with teeth which are curved from end to end. Such gears, however, have always had the teeth of the same cross section from end to end. In other words, they are what may be known as "twisted" gears, and it has always been impossible to successfully machine or cut the teeth of such gears. They can be cast but not machined.

My invention is designed to overcome all of the defects referred to and to provide a gear which can be sucessfully cut or machined; wherein, also the teeth are purposely made of varying shape from end to end in parallel cross sectional planes taken normal to the gear axis, and preferably so that they will be stronger at the ends of the teeth than in the median plane, and where, also, the pressure angle of the tooth varies at different points along the length of the tooth.

In my companion application, filed of even date herewith, Serial No. 758,967, I have described, illustrated and claimed a method of cutting gears, and the present invention relates particularly to the gear cut according to the method specified in said application. It will, therefore, be unnecessary here to describe in detail the method of cutting the gear.

As illustrated in the drawings, the gear comprises a body 1 which is provided with a plurality of teeth 2 which, as illustrated in Fig. 1, are curved or deviate circumferentially of the gear, from end to end thereof. If the teeth of the gear are considered as developed upon a flat surface, in which case they will produce a rack, such as the rack 4 shown in Figs. 3 and 4, it will be found that the curvature of the teeth is in the arcs of circles, although they may be curved in other lines than circles. The centers about which the arcs are struck may be located in any plane transverse to the gear axis, for example, in a plane coinciding with the end face of the gear. In this case the teeth will be gradually curved in only one direction, circumferentially of the gear, from one end to the other. The radii about which the curves are struck may also vary, so that the degree of curvature and amount of deviation of the teeth circumferentially of the gear may be increased or diminished. Preferably, the teeth are formed on curves struck about centers lying in the median transverse plane of the gear, so that the teeth will be symmetrical with respect to said plane and deviate circumferentially of the gear from end to end, first in one direction and then in the other. This produces a gear which in effect is a herring-bone gear of modified type, and when two gears mesh, as illustrated in Fig. 5, the teeth thereof will mesh progressively from both ends toward the median plane, or vice versa, and also exert an endwise thrust or wedging action upon each other. When the gear is symmetrical with respect to the median plane, this thrust will be exactly balanced in opposite directions along the axis and the gears will accommodate themselves and remain in line with each other.

Fig. 2 represents a section taken through the gear at the median plane, while Fig. 3 represents an end view of the gear. It will be seen that at the crests of the longitudinal curves in the teeth, the latter are formed with their side faces shaped to the proper lines of gear teeth, in the present case an involute tooth, and with a given width at their tops and thickness at their bases. Toward the ends the teeth become gradually narrower at their tops and thicker at their bases, in planes normal to the gear axis, due to the particular method of cutting the teeth, referred to. The thickness of the tooth at the pitch line, measured in lines transverse to the gear axis is, however, the same from end to end of the tooth. This amounts in effect to a removal of some of the metal from the tops of the teeth at their ends to the bases of the teeth, thereby concentrating the metal in the end portions of the teeth nearer to the axis of the gear and strengthening the ends of the teeth. This effect becomes more pronounced at increasing distances from the crest of the tooth, or in the form shown, toward the ends of the teeth. The bottoms of the grooves between teeth become narrower and the top portions of the grooves wider toward the ends of the teeth.

In the particular form shown in the drawings, the teeth are of what is known as the "involute" type and are cut by the generating action of two cutters $x$ and $y$, shown in Figs. 6 and 7, the inclined edges 10 and 11 of which are inclined in straight lines to an axis $z$ about which said cutters rotate. These inclined cutting edges 10 and 11 correspond to the side edges of what might be termed the "normal rack" tooth. It is not essential, however, that the cutters used to form the gear be provided with cutting edges inclined on straight lines. The cutters may be of the shape illustrated in Figs. 8 and 9, that is, with their cutting edges $10^a$ and $10^b$ curved or of special shape. Such cutters will generate a tooth of a different cross sectional shape from that shown in Figs. 2 and 3. It will be understood, however, that in any case the shape of the teeth will vary progressively from end to end.

Fig. 3 shows one of my improved gears meshing with a rack 4. This rack has its teeth all in the same flat plane, and is practically nothing more than the development of the teeth of the gear 1 upon said plane. In this connection it is, of course, to be understood that the invention is not limited to cylindrical gears, but is also applicable to racks of the type shown, and also to bevel gears, and that in the claims the word "gear," is considered to include any form of toothed member, such as a spur gear, bevel gear or rack.

In use, the gears may be rotated in either direction. When rotated in one direction, the teeth come successively into engagement and first contact at their extreme outer ends $a$, the contact gradually advancing progressively in both directions toward the crest $b$ of the curve. If the teeth are struck with radii sufficiently short in proportion to the diameter of the gear, and the gears are long enough, the ends of the teeth may have passed out of contact before contact is reached at the crest $b$. Moreover, for the same reason, different portions of two, three, or more teeth may be in contact at the same time.

The gear described has the important advantage that a pair of the gears, or a gear and rack, will mesh or run substantially truly with each other, even if the axes of the shafts are slightly inclined to each other, such as sometimes occurs when the two shafts are installed with poor alinement, or in use get out of alinement. In this case the gear teeth in effect slide lengthwise along each other on the tooth curve and accommodate themselves to each other without the production of any binding action between the teeth. This is impossible with the ordinary herring-bone type of gear. It is, of course, true that since the cross sectional shape of the tooth varies from end to end, as the axes of the gears become more and more inclined to each other the teeth do not mesh with or roll on each other so perfectly. In other words, the inclination of the gear axes to each other could not be carried too far. However, within reasonable limits, the gears will roll or mesh with each other truly, and the very slight variation from perfect meshing is soon counteracted by the wear of the teeth, during which they shape themselves to each other. The gears have the capacity of correcting any usual errors due to shaft misalinement. The gear described has also another important advantage in that the pressure angle of the tooth is different at different points along the tooth. The pressure angle of the tooth is the angle or direction of application of power from one gear to the other and is determined by the angle of inclination of the cutting edges of the generating cutter. As described in my copending application referred to, the effective angle of inclination of the cutter varies along the tooth being formed, thereby producing the variation in the shape of the tooth above described. It also produces a variation in the pressure angle, as the tooth section shown in Fig. 2 which is a section in the median plane of the gear, is different from the shape of tooth shown in Fig. 3, which is an end view of the gear. The tooth which is broader at the base and narrower at the top, shown in Fig. 3, has the greater pressure angle, and in the present case the pressure angle at the median plane is substantially 20°, while at the ends of the gear the pressure angle is 29°. This gives an average pressure angle along the full length of the gear of about 24½°.

What I claim is:—

1. A gear having teeth which extend longitudinally of the gear axis and which teeth are of varying cross section in parallel planes from end to end.

2. A gear having teeth which extend longitudinally of the gear axis, said teeth being wider at their bases at the ends of the teeth than in the median transverse plane of the gear.

3. A gear having teeth which extend longitudinally of the gear axis, said teeth being wider at their bases and narrower at their tops at the ends of the teeth than in the median transverse plane of the gear.

4. A gear having continuous teeth deviating circumferentially of the gear from a straight line parallel with the axis of the gear, the cross section of the tooth in parallel planes varying from end to end thereof.

5. A gear having continuous teeth deviating in both directions circumferentially of the gear from a straight line parallel with the axis thereof, the cross section of the tooth in parallel planes varying from end to end.

6. A gear having continuous teeth extending from end to end thereof, said teeth being curved and having a varying cross section in parallel planes from end to end.

7. A gear having continuous teeth extending from end to end thereof, said teeth being curved on the arcs of circles and of varying cross section in parallel planes from end to end.

8. A gear having continuous teeth extending from end to end thereof, said teeth being curved on the arcs of circles and of varying cross section in parallel planes from end to end, said gear being symmetrical with respect to its median transverse plane.

9. A toothed member provided with curved teeth which vary in cross section in parallel planes from end to end.

10. A toothed member provided with continuous teeth which are curved from end to end and symmetrical with respect to the median plane of the member, said teeth being of varying cross section in parallel planes from end to end.

11. A gear having teeth which extend longitudinally of the gear axis, said teeth being narrower at their tops in parallel transverse planes at the ends of the teeth than in the median transverse plane of the gear.

In testimony whereof, I have hereunto set my hand.

ISAAC E. McCRACKEN.

Witnesses:
 ELBERT L. HYDE,
 JOHN W. TODD.